(12) United States Patent
Goodsitt et al.

(10) Patent No.: US 12,164,677 B2
(45) Date of Patent: Dec. 10, 2024

(54) METHODS AND SYSTEMS FOR FEDERATED LEARNING UTILIZING CUSTOMER SYNTHETIC DATA MODELS

(71) Applicant: Capital One Services, LLC, McLean, VA (US)

(72) Inventors: Jeremy Goodsitt, Champaign, IL (US); Michael Davis, Arlington, VA (US); Taylor Turner, Richmond, VA (US); Kenny Bean, Herndon, VA (US); Tyler Farnan, San Diego, CA (US)

(73) Assignee: Capital One Services, LLC, McLean, VA (US)

( * ) Notice: Subject to any disclaimer, the term of this patent is extended or adjusted under 35 U.S.C. 154(b) by 183 days.

(21) Appl. No.: 18/063,394

(22) Filed: Dec. 8, 2022

(65) Prior Publication Data
US 2024/0193308 A1 Jun. 13, 2024

(51) Int. Cl.
*G06F 21/64* (2013.01)
*G06N 3/098* (2023.01)
(52) U.S. Cl.
CPC ............. *G06F 21/64* (2013.01); *G06N 3/098* (2023.01)

(58) Field of Classification Search
CPC .. G06F 21/64; G06F 21/6245; G06F 21/6254; G06N 3/098; G06N 3/044; G06N 3/045; G06N 3/047
See application file for complete search history.

(56) References Cited

U.S. PATENT DOCUMENTS

| | | | |
|---|---|---|---|
| 11,675,817 B1 * | 6/2023 | Pratik | G06N 5/046 707/740 |
| 2017/0243028 A1 * | 8/2017 | LaFever | G06F 21/6254 |
| 2019/0238516 A1 * | 8/2019 | Weggenmann | G06F 21/6254 |
| 2021/0042575 A1 * | 2/2021 | Firner | G06N 3/04 |
| 2022/0261494 A1 * | 8/2022 | Truong | G06V 20/62 |
| 2022/0366040 A1 * | 11/2022 | Marbouti | G06N 3/045 |
| 2023/0367855 A1 * | 11/2023 | Garcia-Arellano | G06N 3/08 |

\* cited by examiner

*Primary Examiner* — El Hadji M Sall
(74) *Attorney, Agent, or Firm* — Foley & Lardner LLP

(57) ABSTRACT

Methods and systems are described for novel uses and/or improvements to federated learning. As one example, methods and systems are described for improving the applicability of federated learning across various applications and increasing the efficiency of training a global model through federated learning. As another example, methods and systems are described for ensuring comprehensive training data is available to models assigned by the federated learning server. Additionally, methods and systems are described for improving the rate of training a global model through federated learning.

20 Claims, 8 Drawing Sheets

METHODS AND SYSTEMS FOR FEDERATED LEARNING UTILIZING CUSTOMER SYNTHETIC DATA MODELS

BACKGROUND

Federated learning promises to deliver efficient machine learning training without compromising user privacy. One problem with federated learning is the lack of computational efficiency. The federated learning system is limited by the speed, integrity, and availability of clients. Federated learning works by using a federated learning server to send a global model to clients. Clients send parameters to the federated learning server in response. The federated learning server updates the global model with the parameters received from the clients. If clients are not connected to the federated learning server, fail to respond to the training commands, or have missing data, the global model may not be updated or optimized efficiently. Additionally, clients often have restrictions as to when they will respond to a federated learning server (e.g., time of day, charging status, or Internet connection status). Waiting for clients to respond to the server can reduce the overall speed of federated learning.

Another problem with federated learning is that it relies solely on data contained on a client: clients may not have the necessary data to train the global model. Furthermore, there is no way to use a client to train a model if the client does not have complete datasets. By disregarding clients with incomplete datasets, models may miss valuable real user data contained on a client.

Rigidity in training is another downside of federated learning systems. Currently, it is not possible to train multiple versions of the same global model. Restricting training to one version of the global model may leave federated learning open to a local minima problem. Furthermore, restricting training to one version of the global model does not allow for granular adjustments of the weights in a global model.

SUMMARY

Methods and systems are described herein for novel uses and/or improvements to federated learning. As one example, methods and systems are described herein for improving the applicability of federated learning across various applications and increasing the efficiency of training a global model through federated learning. As another example, methods and systems are described herein for ensuring comprehensive training data is available to models assigned by the federated learning server. Additionally, methods and systems are described herein for improving the rate of training a global model through federated learning.

One technical problem with federated learning is that existing systems send the same global model to all clients and interpret the client responses equally. This does not maximize the training efficiency of the model. Efficiency is not maximized because in some instances it may be more beneficial to weigh specific subsections of clients separately. For example, in applications such as fraud detection, grouping clients with attributes indicating fraudulent activity improves the rate of training of the model by making it easier for the model to target or identify minority classes. One solution to overcoming this technical problem is to cluster clients. Existing systems do not cluster clients according to specific attributes because clients are typically treated as separate and distinct entities in a federated learning system. While clustering clients may maximize training efficiency because clusters of minority classes are already determined and easy to target for training, clustering clients also creates novel technical challenges such as how to cluster clients according to relevant attributes, how to maintain privacy, and how to ensure accuracy in clustering.

To overcome technical challenges related to how to cluster clients according to relevant attributes, methods and systems disclosed herein allow a clustering algorithm to transmit client attributes to help cluster clients on the federated learning server before sending the global model for training. Notably, transmitting attributes of the client allows for clustering of clients based on the relevant attributes but preserves privacy by transmitting attributes instead of real user data.

More specifically, the federated learning server sends both a data profiler and the global model to profile data on clients based on schemas, statistics, and entities contained on the client and groups clients based on the profiles after model training is conducted. For example, the federated learning server sends an accompanying data profiling software to categorize data contained in a database on a client. By sending data profiling software, the federated learning server can cluster responses from clients that share similar attributes and adjust the global model based on what the client sends back to the federated learning server. Accordingly, the methods and systems provide a way to maximize training efficiency of a global model through clustering clients without compromising client privacy.

In some aspects, methods and systems are designed to generate a federated learning model based on remotely profiled data. The system retrieves a dataset from a user profile, wherein the user profile is stored locally on a user device; determines, using a data profiler, a data profile from the dataset; clusters, using a clustering algorithm, the dataset based on the data profile; and generates a cluster designation for training a federated learning model, wherein the federated learning model is trained on a remote server and transmits the cluster designation to the remote server.

Another technical problem with federated learning is the reliance on locally stored data for training. This creates a fundamental privacy concern but may also lead to inaccurate or incomplete results due to incomplete training datasets on the client. To mitigate inaccurate or incomplete results due to incomplete datasets as well as alleviate privacy concerns, the system may generate synthetic data based on real user data. By generating synthetic data from real user data, the benefits of using real user data, such as more accurate model training, are preserved because the synthetic data generated shares the same entropy as real user data without exposing sensitive client information. Additionally, by using synthetic data, more clients are eligible to train a global model because clients with incomplete datasets that would typically be excluded from training can use synthetic data to augment the local data. Furthermore, the combination of local user data on the client devices in conjunction with the locally generated synthetic data allows for more comprehensive datasets for training the global model sent by the federated learning server and thus a more comprehensive training of the local model.

While generating synthetic data may produce the aforementioned benefits, generating synthetic data also creates a novel technical challenge, specifically, how to generate synthetic data such that it accurately reflects the actual user data and does not introduce bias, particularly in federated learning environments. To overcome this novel technical challenge in generating synthetic data based on actual user data on a client, methods and systems disclosed herein use a synthetic data generator to create synthetic data based on attributes contained in actual user data on client devices. For example, the system uses attributes on a client as an input to a synthetic data generation model that outputs synthetic data to supplement datasets used by models sent by the federated learning server.

In some aspects, methods and systems are designed to generate synthetic data based on local client data. The system retrieves a dataset from a user profile, wherein the user profile is stored locally on a user device; processes the dataset, by removing anomalies, incomplete data, or outliers, to generate a feature set; selects a first feature from the feature set; inputs the first feature into a synthetic data generation model, wherein the synthetic data generation model generates a first synthetic output; obfuscates the first synthetic output to generate a first synthetic feature; generates a first synthetic dataset based on the first synthetic feature; directs a user device to train a machine learning model using the first synthetic dataset; and transmits the machine learning model first synthetic dataset to a centralized remote server from the user device for training a federated learning model.

Another technical problem with traditional federated learning is that the federated learning server may wait for each client to respond before moving forward with federated learning, which may reduce the efficiency of training the global model. Furthermore, in traditional federated learning, the efficiency of training the global model is correlated with the quality and quantity of client reporting: higher quality and larger quantity of client reporting promotes more efficient training of a global model. Thus, the delay in client reporting in conjunction with the necessity of high quality and a large quantity of client reporting highlights an efficiency problem in traditional federated learning.

One solution to improving the efficiency while contending with a delay in client reporting is forking the global model. By forking the global model, the efficiency of training the global model improves because multiple versions of the global model can be trained simultaneously. Increasing the number of versions of models trained simultaneously means that when clients respond, there are multiple sets of parameters instead of just one; this increases the amount of training feedback for federated learning, thereby improving training efficiency.

However, forking the global model introduces a novel technical problem. Specifically, as federated learning relies on a single global model, making drastic changes to the global model is risky because if the result is undesired, the lack of model history makes it challenging to revert to a prior step. As such, each fork is limited in the size of its incremental changes that can be made to the global model before distribution by the federated learning server. This both limits the training efficiency and slows the overall training time.

One solution to alleviating the reliance on a single global model is integrating a forking mechanism for federated learning ("forkable federated learning"). In comparison to traditional federated learning, forkable federated learning can make larger changes to the global model before sending the global model to clients. Forkable federated learning can make larger changes because there is a history of models to revert to if the forked version of the global model produces undesired results. Forking, and keeping track of forked variations of a model, allows federated learning to make bigger adjustments to the global model without the risk of losing previous iterations of the global model because if the adjustments lead to an undesired result, the system can revert to a previous version of the global model and continue training. However, integrating a forking mechanism also presents several technical challenges, such as how to merge favorable training results with the global model and how to maintain the efficiency and speed of the model training.

To overcome the technical challenge of merging favorable training results, methods and systems disclosed herein create a version control system for federated learning. The methods and systems include sending various versions of the global model to clients from a federated learning server. The methods and systems include merging forked versions of the global model by either allowing the forked model to take over the main path or using shared parameters to allow for merging the two models. Sending various versions of the global model allows for larger adjustments to the global model. Accordingly, the methods and systems increase federated learning efficiency.

In some aspects, methods and systems are designed to fork federated learning pathways for improved versatility by receiving, by a federated learning model being executed on a remote server, a first aggregated data stream, wherein the first aggregated data stream receives data from a plurality of user devices and wherein the federated learning model is trained on the first aggregated data stream; selecting a first subset of the plurality of user devices; generating a first fork in the first aggregated data stream by generating a second aggregated data stream at a first time, wherein the second aggregated data stream receives data from the first subset of the plurality of user devices; generating a first fork identifier based on the first time and the first subset of the plurality of user devices; training a first machine learning model on the second aggregated data stream; receiving a first user request to merge the first machine learning model into the federated learning model; and in response to the first user request, determining a first weight for merging the first machine learning model into the federated learning model based on the first fork identifier, and merging the first machine learning model into the federated learning model based on the first weight.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details, or with an equivalent arrangement. In other cases, well-known structures and devices are shown in block diagram form in order to avoid unnecessarily obscuring the embodiments of the invention.

Figure 1:
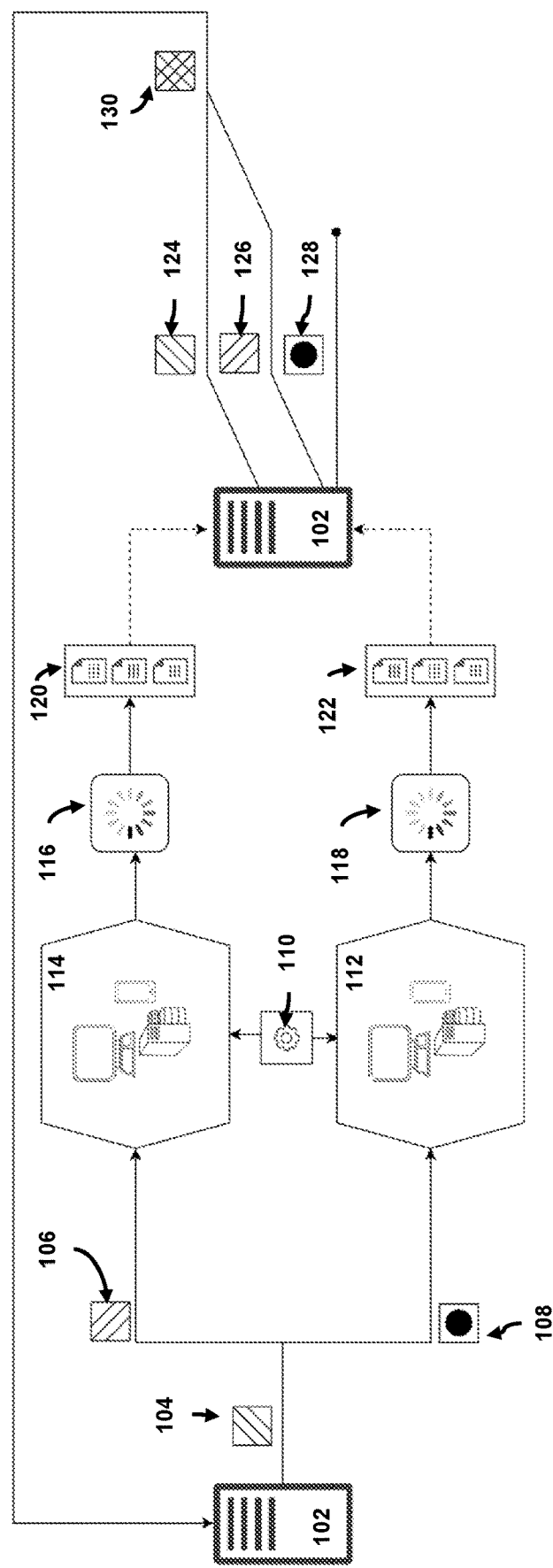
FIG. 1 shows an illustrative diagram of forkable federated learning with client clustering and synthetic data generation, in accordance with some embodiments.

FIG. 1 shows an illustrative diagram of forkable federated learning providing a practical benefit of improving the efficiency of federated learning, in accordance with one or more embodiments. For example, system 100 may include federated learning model 102. Federated learning model 102 may be referred to as a federated learning server. Federated learning model 102 may indicate a server for conducting federated learning. Federated learning model 102 may be responsible for facilitating global model forking. Federated learning model 102 may include the global model 104 which may act as the main branch when merging models. The federated learning model 102 may include one or more branched variations of global model 104 (e.g., forked version of the global model 106 and forked version of the global model 108).

FIG. 1 also shows an illustrative diagram of client clustering providing a practical benefit of improving the efficiency of federated learning, in accordance with one or more embodiments. Federated learning model 102 may be responsible for running a data profiler application. For example, a data profiler 110 may be included in the system, either as part of federated learning model 102 or acting independently on a separate server. The system may cluster clients using data profiles from data profiler 110 (e.g., client cluster 112 and client cluster 114). Federated learning model 102 may send the forked versions of the global models (e.g., forked version of the global model 106 and forked version of the global model 108) to the client clusters (e.g., client cluster 112 and client cluster 114) generated by data profiler 110.

The client clusters may then train the model locally using synthetic data from a synthetic data generator when necessary (e.g., training process 116 and training process 118). When training is complete, clients may produce outputs 120 and 122 that may contain parameters. Clients may send outputs 120 and 122 back to federated learning model 102 for aggregation. Federated learning model 102 may aggregate the parameters received by client clusters 112 and 114 by performing an assessment on each of the outputs generated by the clusters (e.g., global model parameters 124 from the main path of aggregation, outputted parameters from forked version of the global model 106, 126, and outputted parameters from forked version of the global model 108, 128) to determine which of the outputs should be merged with the global model parameters 124 from the main path of aggregation. Federated learning model 102 may determine that outputted parameters from forked version of the global model 106, 126 produce undesired results and may not be merged into the global model. Federated learning model 102 may determine that outputted parameters from the forked version of the global model 108, 128 produce desired results and may be merged into the global model to produce a new global model 130. After new global model 130 is determined, the process may repeat with the new global model 130 as the main path of aggregation for the next training iteration.

FIG. 1 also shows synthetic data generation providing a practical benefit of improving privacy during federated learning, in accordance with one or more embodiments. Federated learning model 102 may be responsible for sending, with the global model, a synthetic data generator.

For example, FIG. 1 illustrates how to improve the efficiency of federated learning methods without compromising client privacy. In contrast, conventional systems may create mechanisms that improve the efficiency of federated learning, but such improvements may compromise privacy; for example, such improvements may improve efficiency by sending sensitive information to the federated learning model. Privacy is a cornerstone of federated learning. By approaching solutions to improve efficiency from a privacy standpoint, client data remains confidential, thereby preserving the underlying principles of federated learning. As such, the system may allow for increased refinement in specific use cases, preserve client privacy without compromising the quality of training data, and allow bigger changes to the parameters in the global model.

In some embodiments, the system may merge two forked versions of the global model and accept the merged versions as the new global model. The forked versions could be varying branches testing different combination of hyperparameters. This would effectively discard the current global model and replace it with an aggregate of two, better performing forked versions. By doing so, the system may redirect training to focus to better performing models without the hinderance of an underperforming global model. By allowing the global model to be discarded in exchange for two forked versions of the global model, the federated learning process can be conducted faster as the system does not have settle for an underperforming global model.

The system may include a user device. As referred to herein, a "user device" may include a device participating in the federated learning process (e.g., mobile phone, desktop workstation, server, etc.). A user device may be referred to as a "client." In some embodiments, the user device may comprise a local dataset.

As referred to herein, "local dataset" should be understood to mean an electronic representation of data stored on the user device. For example, the local dataset may include device information, transaction history, message history, call history, and/or usage information. The local dataset may be used by the federated learning model to train a machine learning model locally on a user device.

The system may include a federated learning model. As referred to herein, a "federated learning model" may include a server that conducts federated learning. The server may be referred to as a "federated learning server." For example, the federated learning model may manage a global model and send local models to user devices. As an additional example, the federated learning model may manage a global model and send one or more of a hierarchy of specialized models to user devices as a local model. By doing so there may be more than one local model. The global model may be the model that is being trained and optimized through federated learning. The local model may be the model that is distributed by the federated learning model to the client devices.

As referred to herein, a "global model" should be understood to mean the model that is being trained and optimized through federated learning. For example, the global model may include a machine learning model. The machine learning model may be used to detect specific types of transactions, identify images, and/or identify speech patterns. The global model may be sent to user devices to use the local dataset on the user devices for training. The global model may also be referred to as an "aggregated data stream."

As referred to herein, a "local model" should be understood to mean the model that is being trained locally on a user device. For example, upon receipt of the global model on the user device, the user device is training the local model which, prior to training, may be the same as the global model. The local model may also be referred to as an "aggregated data stream."

The system may include a data profiler application. As referred to herein, a "data profiler application" may include a piece of software designed to interpret and categorize the contents of a dataset. For example, the federated learning model may send a data profiler application to a user device to gain a better understanding of the type of data stored on the user device without compromising the privacy of the user device. The data profiler application may take a dataset as an input and produce data profiles as an output.

As referred to herein, a "data profile" should be understood to mean a category for data. For example, a data profile may categorize one cell, one column, and/or multiple columns of a relational database. Additionally or alternatively, a data profile may categorize a portion of data not stored in a relational database. The data profile may indicate features of the dataset, such as a sensitivity ranking, or features of the device that is storing the dataset, such as a device model. The data profile may include a "dictionary" containing statistics and predictions about the dataset.

As referred to herein, a "dictionary" should be understood to mean a structure to store statistical and predictive information corresponding to a dataset or a portion of a dataset. For example, the dictionary may include information regarding the sensitivity of the data in a dataset, the expected or actual size of data stored in a dataset, or a score indicating the likelihood of fraudulent transactions represented in a dataset. A dictionary may be used to help profile data on user devices which may help in clustering similar user devices during federated learning.

The system may include outputs. As referred to herein, an "output" may include model parameters. For example, after a user device trains a local model, the model output may be sent to the federated learning model for aggregation. An output may also be referred to as an "update." Additionally or alternatively, the output may be referred to as an "aggregated data stream."

The system may include parameters. As referred to herein, a "parameter" may include a variable that is used by a machine learning model that is required by the model to make predictions. Additionally or alternatively, a parameter may be estimated or learned from the dataset used to train the model or data from other sources. Parameters may include model weights, such as in the case of training an artificial neural network.

The system may include hyper-parameters. As referred to herein, a "hyper-parameter" may include a configuration that is determined outside of the scope of the model. For example, the federated learning model may determine a hyper-parameter. The hyper-parameter may be used to make minute adjustments to training that may improve or reduce the accuracy of the model. Hyper-parameters may include the learning rate, such as in the case of training a neural network.

Figure 2:
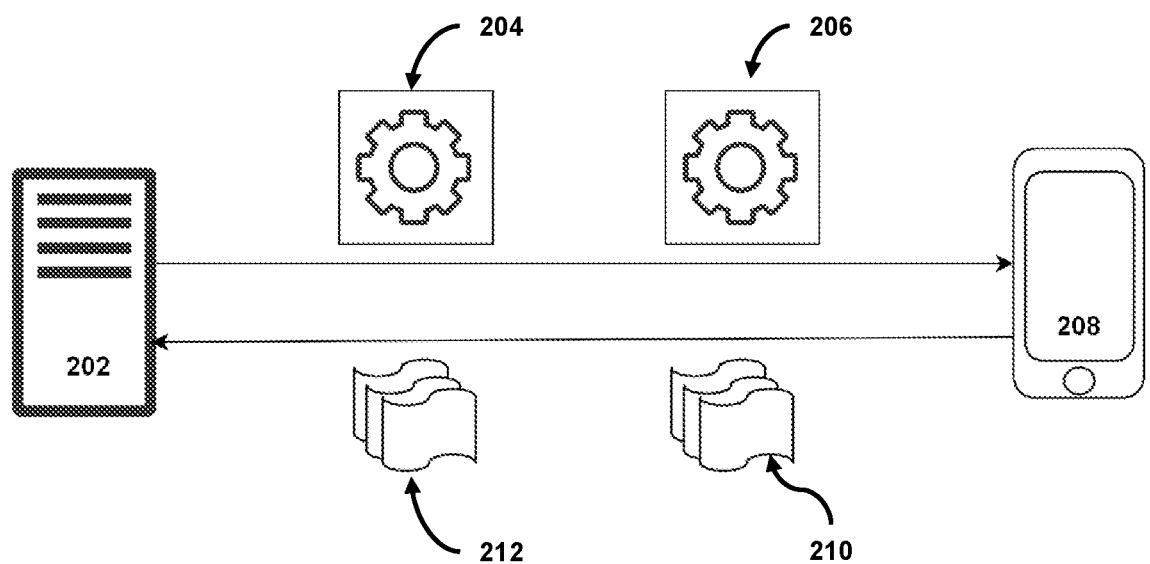
FIG. 2 shows an illustrative diagram of utilizing data profiles for client clustering and selection in federated learning, in accordance with some embodiments.

FIG. 2 shows an illustrative diagram of utilizing data profiles for client clustering and selection in federated learning, in accordance with one or more embodiments. For example, system 200 may include a federated learning server 202, which may send global model 204 and data profiler 206 to client 208. Client 208 may train global model 204 and run data profiler 206. Client 208, after running data profiler 206, may output parameters 210 as well as schemas, statistics, entities, or other attributes 212 that may be useful in categorizing the client device, and send them back to federated learning server 202. For example, FIG. 2 illustrates how a data profiler integrates with a federated learning server to increase the efficiency of federated learning without compromising client privacy.

Conventionally, federated learning servers and clients may not utilize data profilers to cluster clients because it is difficult to cluster clients while simultaneously preserving privacy in federated learning. In comparison, using a data profiler locally preserves privacy as the data profiler may not send any client data back to the server. For example, the client may run the data profiler received from the federated learning server locally on real user data and, according to the data, generate attributes that are useful in clustering the device with similar devices. The attributes may not contain personally identifiable information. The attributes may be sent back to the federated learning server for use in aggregation while maintaining client privacy. As such, the system may improve the efficiency of federated learning by targeting the minority class of clients.

The federated learning model may target a minority class. As referred to herein, a "minority class" may include a group of user devices that are not well represented among the user devices available to the federated learning model. For example, the federated learning model may target devices that are suspected to be fraudulent. Most clients in a system are likely not fraudulent. Therefore, being able to target fraudulent devices makes training a model for fraud detection simpler as it is easy to differentiate between fraudulent and non-fraudulent devices.

Figure 3A:
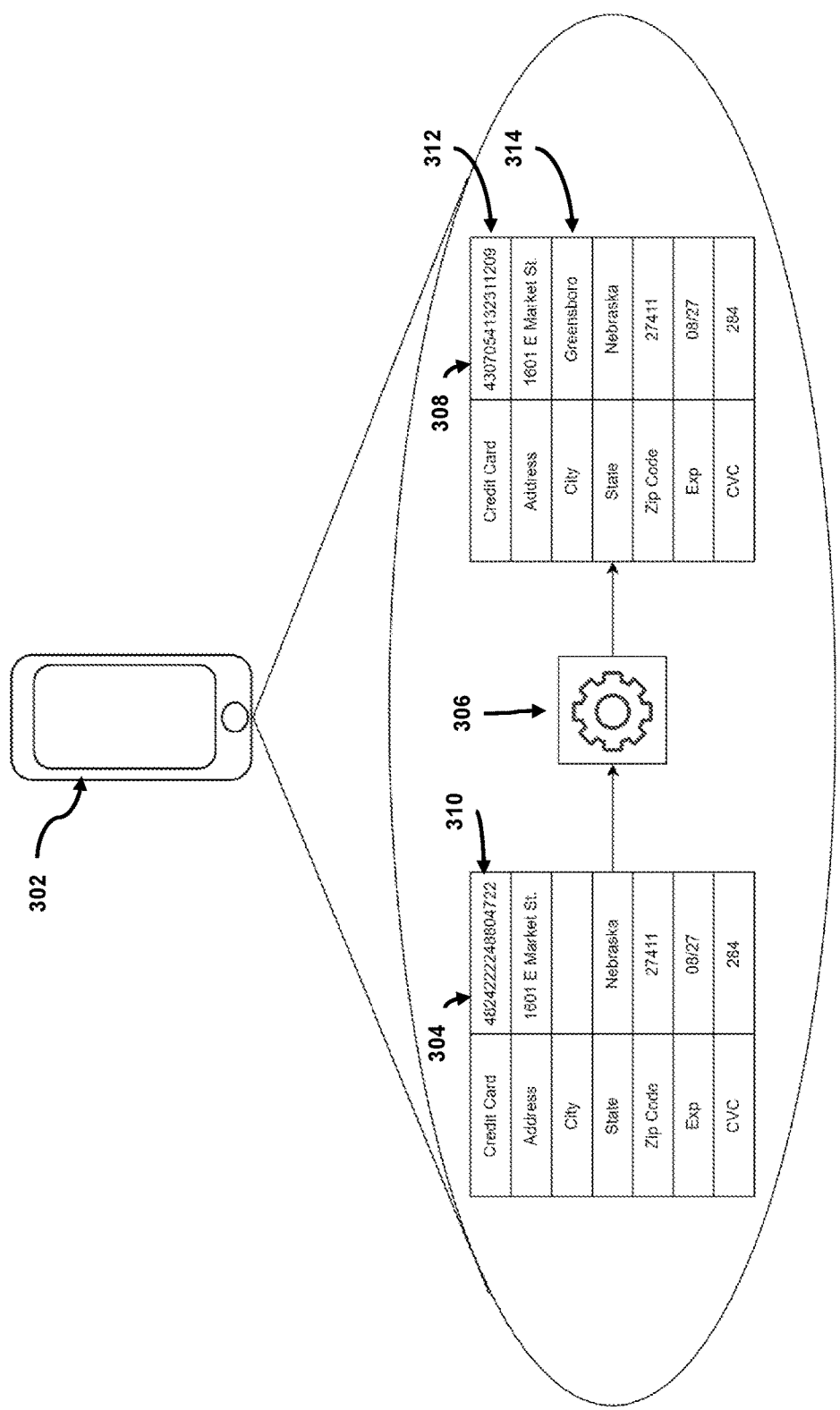
FIGS. 3A-B show an illustrative diagram of federated learning components, in accordance with some embodiments.

FIG. 3A shows an illustrative diagram of federated learning utilizing customer synthetic data models, in accordance with one or more embodiments. For example, system 300 may include client 302, which receives the global model from a federated learning server as well as a synthetic data generator 306. Client 302 may contain locally stored real user data 304. Locally stored real user data 304 may include sensitive information such as financial information or healthcare information. Synthetic data generator 306 may accept, as input, locally stored real user data 304 and obfuscate or populate one or more portions of the dataset prior to training the global model distributed by the federated learning server. For example, synthetic data generator 306 may convert sensitive credit card number 310 into an obfuscated model that preserves the issuer information of the credit card (e.g., obfuscated credit card number 312) and store it in obfuscated dataset 308 (e.g., card service provider or length of the card number). For example, synthetic data generator 306 may populate a missing city with a city that preserves the essential qualities of the data 314 (e.g., a city corresponding to a specific country or a city corresponding to a specific zip code).

For example, FIG. 3A illustrates a model for generating synthetic data for use in a federated learning system that solves the technical challenge of training a global model using real client data when datasets stored on a client are missing information. Existing approaches may disregard clients with incomplete datasets; however, by generating synthetic data and integrating the synthetic portions with real data, more clients are eligible to train the distributed global model. Synthetic data generator 306 may use data from the locally stored real user data to generate personalized synthetic data that preserves the benefits of using locally stored real user data when conducting federated learning without compromising user privacy. Conventional systems may generate synthetic data by sending client data back to the federated learning server for analysis and generation. By generating synthetic data locally based on locally stored real user data, the system maintains client privacy by not sending locally stored real user data to the federated learning server. As such, the system may make more clients eligible to train the global model while simultaneously preserving client privacy.

Figure 3B:
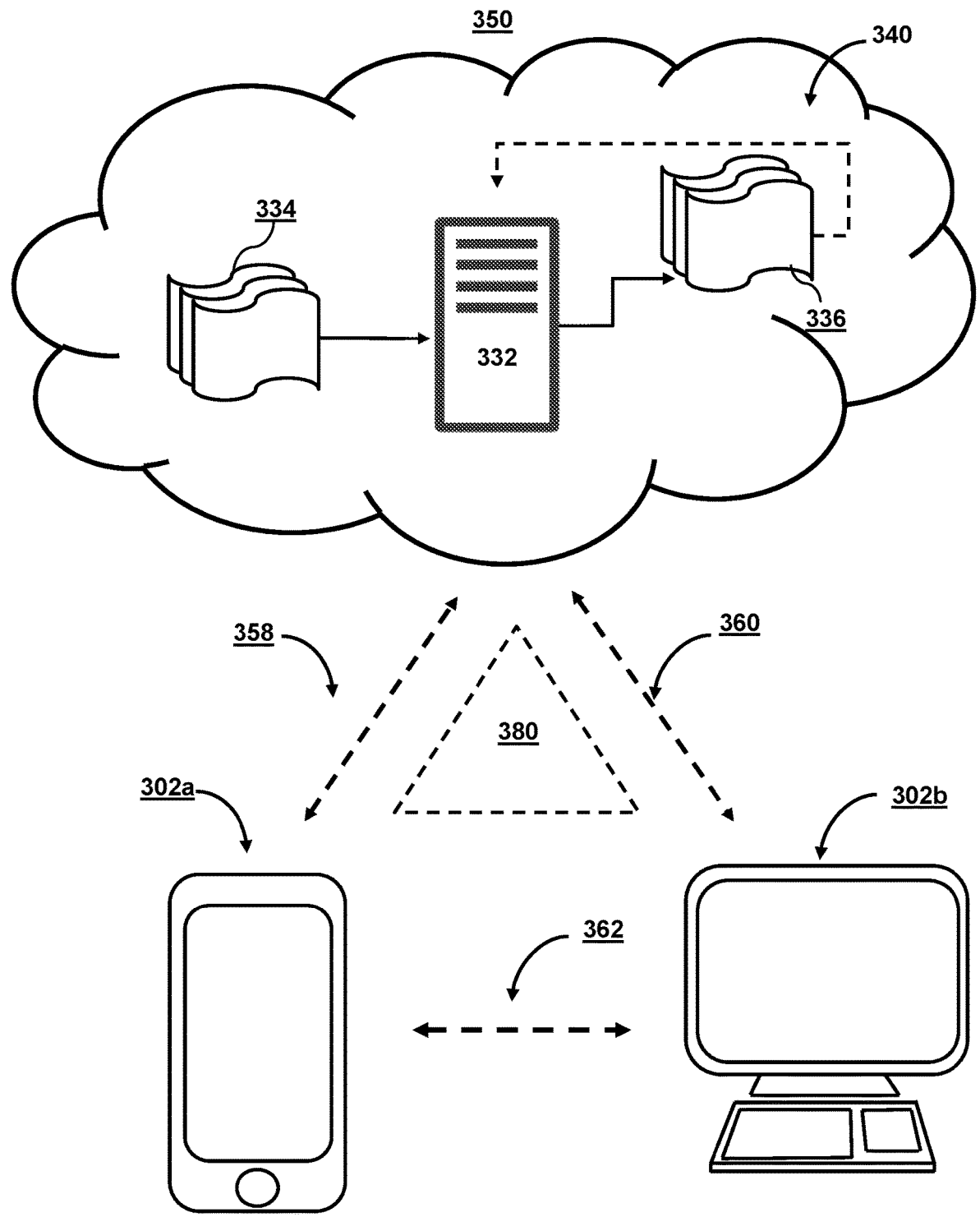

FIG. 3B shows illustrative components for a system used to maintain user device privacy, increase the training efficiency of a global model, and allow for more granular training of the global model, in accordance with one or more embodiments. For example, FIG. 3B may show illustrative components for improving the efficiency of federated learning while maintaining user device privacy. As shown in FIG. 3B, system 350 may include mobile device 302a and user terminal 302b. For example, mobile device 302a and user terminal 302b in FIG. 3B may correspond to client 302 in FIG. 3A. While shown as a smartphone and a personal computer, respectively, in FIG. 3B, it should be noted that mobile device 302a and user terminal 302b may be any computing device, including, but not limited to, a laptop computer, a tablet computer, a hand-held computer, and other computer equipment (e.g., a server), including "smart," wireless, wearable, and/or mobile devices. FIG. 3B also includes cloud components 340. Cloud components 340 may alternatively be any computing device as described above, and may include any type of mobile terminal, fixed terminal, or other device. For example, cloud components 340 may be implemented as a cloud computing system, and may feature one or more component devices. It should be noted that system 350 is not limited to two devices. Users may, for instance, utilize one or more devices to interact with one another, with one or more servers, or with other components of system 350. It should also be noted that, while one or more operations are described herein as being performed by particular components of system 350, these operations may, in some embodiments, be performed by other components of system 350. As an example, while one or more operations are described herein as being performed by components of mobile device 302a, these operations may, in some embodiments, be performed by components of cloud components 340. In some embodiments, the various computers and systems described herein may include one or more computing devices that are programmed to perform the described functions. Additionally or alternatively, multiple users may interact with system 350 and/or one or more components of system 350. For example, in one embodiment, a first user and a second user may interact with system 350 using two different components.

With respect to the components of mobile device 302a, user terminal 302b, and cloud components 340, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3B, mobile device 302a and user terminal 302b each include a display upon which to display data (e.g., conversational responses, queries, and/or notifications).

Additionally, as mobile device 302a and user terminal 302b are shown as a touchscreen smartphone and a personal computer, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 350 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3B also includes communication paths 358, 360, and 362. Communication paths 358, 360, and 362 may include the Internet, a mobile phone network, a mobile voice or data network (e.g., a 5G or LTE network), a cable network, a public switched telephone network, or other types of communications networks or combinations of communications networks. Communication paths 358, 360, and 362 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 340 may include a federated learning server 332. Federated learning server 332 may include a client clustering model that clusters user devices with similar attributes prior to distributing the global model. Federated learning server 332 may also include a synthetic data generator that is sent to user devices to generate synthetic data locally on a user device. Additionally, federated learning server 332 may be able to fork the global model to send variations of the model to different user devices simultaneously.

Cloud components 340 may include updates 334 from user devices that are transmitted by the user devices after training a local model and aggregate outputs 336 that are aggregated updates based on the updates 334 from user devices. In some instances, the aggregated updates may be reintroduced into the federated learning server to inform the next round of federated learning.

Cloud components 340 may include a model, which may be a machine learning model, an artificial intelligence model, etc. (which may be referred to collectively as "models" herein). Federated learning server 332 may include a model. The model may take updates 334 as an input and provide outputs 336. The inputs may include multiple updates from user devices, such as weights used when training a local model. Each of the plurality of updates (e.g., updates 334) may include data subsets related to user data, predicted forecasts and/or errors, and/or actual forecasts and/or errors. In some embodiments, outputs 336 may be fed back to the model on federated learning server 332 as input to train the model on federated learning server 332 (e.g., alone or in conjunction with user indications of the accuracy of outputs 336, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., recommended updates to the parameters in the global model).

In a variety of embodiments, the model on federated learning server 332 may update its configurations (e.g., weights, biases, or other parameters) based on the assessment of its prediction (e.g., outputs 336) and reference feedback information (e.g., user indication of accuracy, reference labels, or other information). In a variety of embodiments, where federated learning server 332 includes a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the neural network on federated learning server 332 may be trained to generate better predictions.

In some embodiments, federated learning server 332 may include an artificial neural network. In such embodiments, a model on federated learning server 332 may include an input layer and one or more hidden layers. Each neural unit of the model on federated learning server 332 may be connected with many other neural units of the model on federated learning server 332. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. The model on federated learning server 332 may be self-learning and trained, rather than explicitly programmed, and can perform significantly better in certain areas of problem solving, as compared to traditional computer programs. During training, an output layer of the model on federated learning server 332 may correspond to a classification of the model on federated learning server 332, and an input known to correspond to that classification may be input into an input layer of the model on federated learning server 332 during training. During testing, an input without a known classification may be input into the input layer, and a determined classification may be output.

In some embodiments, the model on federated learning server 332 may include multiple layers (e.g., where a signal path traverses from front layers to back layers). In some embodiments, backpropagation techniques may be utilized by the model on federated learning server 332 where forward stimulation is used to reset weights on the "front" neural units. In some embodiments, stimulation and inhibition for the model on federated learning server 332 may be more free-flowing, with connections interacting in a more chaotic and complex fashion. During testing, an output layer of the model on federated learning server 332 may indicate whether a given input corresponds to a classification of the model on federated learning server 332. (For example, the model on federated learning server 332 may include classifications such as clusters of user devices that may be better suited for a specific fork of the global model. Alternatively, the model on federated learning server 332 may include classifications such as clusters of user devices that require a synthetic data generation model to accompany the global model.)

In some embodiments, the model on federated learning server 332 may automatically perform actions based on outputs 336. In some embodiments, the model on federated learning server 332 may not perform any actions. The output of the model on federated learning server 332 may be used to inform future rounds of federated learning.

System 350 also includes API layer 380. API layer 380 may allow the system to generate summaries across different devices. In some embodiments, API layer 380 may be implemented on mobile device 302*a* or user terminal 302*b*. Alternatively or additionally, API layer 380 may reside on one or more of cloud components 340. API layer 380 (which may be a REST or Web services API layer) may provide a decoupled interface to data and/or functionality of one or more applications. API layer 380 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in business-to-business ("B2B") transactions.

API layer 380 may use various architectural arrangements. For example, system 350 may be partially based on API layer 380, such that there is strong adoption of SOAP and RESTful Web services, using resources like Service Repository and Developer Portal, but with low governance, standardization, and separation of concerns. Alternatively, system 350 may be fully based on API layer 380, such that separation of concerns between layers like API layer 380, services, and applications is in place.

In some embodiments, the system architecture may use a microservice approach. Such systems may use two types of layers: front-end layer and back-end layer, where microservices reside. In this kind of architecture, the role of API layer 380 may provide integration between the front-end layer and the back-end layer. In such cases, API layer 380 may use RESTful APIs (exposition to front-end or even communication between microservices). API layer 380 may use AMQP (e.g., Kafka, RabbitMQ, etc.). API layer 380 may use incipient usage of new communications protocols such as gRPC, Thrift, etc.

In some embodiments, the system architecture may use an open API approach. In such cases, API layer 380 may use commercial or open source API platforms and their modules. API layer 380 may use a developer portal. API layer 380 may use strong security constraints applying WAF and DDoS protection, and API layer 380 may use RESTful APIs as standard for external integration.

Figure 4:
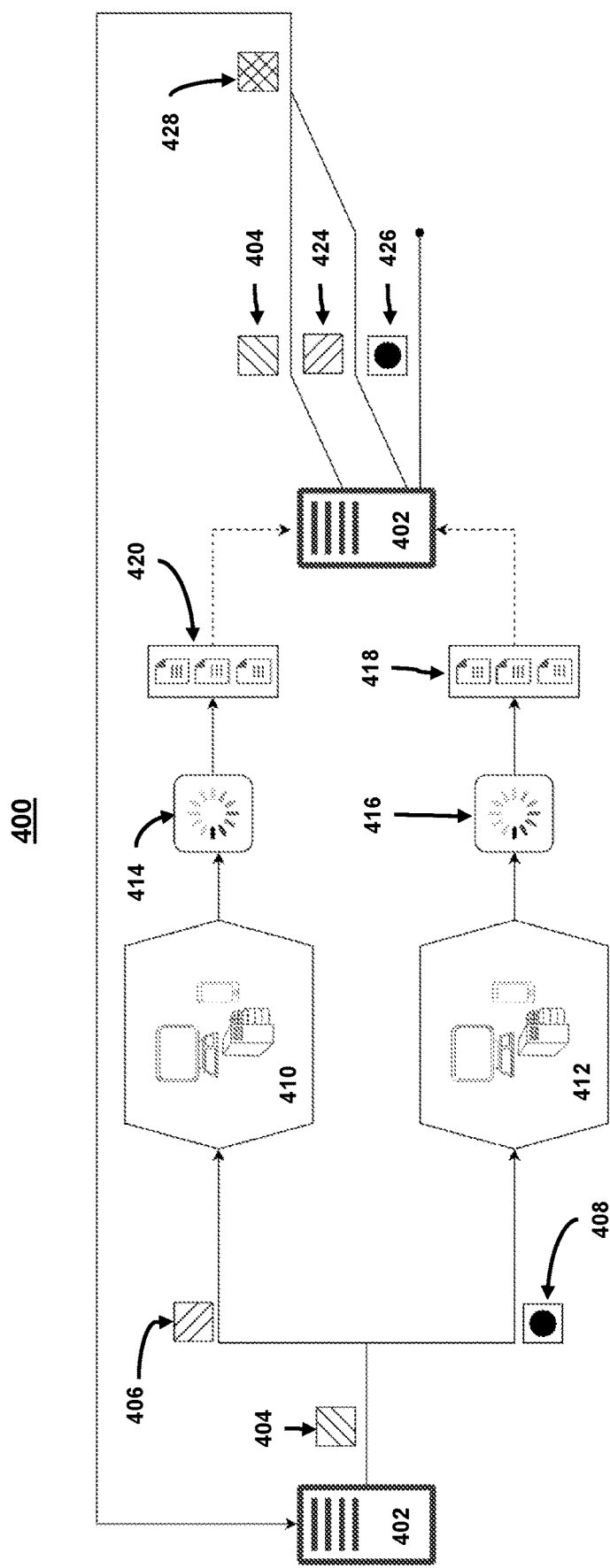
FIG. 4 shows an illustrative diagram of forkable federated learning pathways for versatile learning pathways, in accordance with some embodiments.

FIG. 4 shows an illustrative diagram of forkable federated learning pathways for versatile learning pathways, in accordance with one or more embodiments. For example, system 400 may include federated learning server 402. Federated learning server 402 may include global model 404, which may be a machine learning model. The global model may be altered by the federated learning server.

The federated learning server may adjust parameters such as the number of federated learning rounds until the learning is finished, the total number of clients that receive the global model, or the learning rate on the client devices. The federated learning server may branch the global model into various models based on the parameter adjustments. By branching the global model into various models based on the parameter adjustments, the system allows improved efficiency for training models. For example, in conventional federated learning systems, the federated learning server sends a global model to clients and the clients train the local model before sending updates back to the federated learning server. This type of conventional learning may be slow because the federated learning server must wait for an update from each client before another round of training can begin. Forking the global model may lead to a lower wait time for updates from the user devices. The reduced wait time may occur because the overall number of user devices selected for each variation is smaller than if the model was not forked. Furthermore, the reduced wait time may be due to the increase in the number of simultaneous trainings conducted, which leads to the federated learning model receiving more updates from the same number of clients in the same or reduced timespan. For example, FIG. 4 illustrates two variations of global model 404 (i.e., variation 406 and variation 408).

Versions of the global model may be sent to one or more of the same or different clients (e.g., clients 410 and clients 412). Clients 410 and clients 412 may train the local models during training 414 or training 416. After training, clients produce update 418 and update 420. Both updates may be aggregated at federated learning server 402. Aggregation at federated learning server 402 may include assessing the output of training both local models in addition to the global model and determining a combination of one or more of the models and model outputs to further optimize the global model. For example, global model 404 may be compared to update 424 and update 426 by federated learning server 402. Federated learning server 402 may determine that update 426 does not produce desirable results and terminate training the model with the associated parameters.

Alternatively, federated learning server 402 may determine that global model 404 is better in terms of accuracy, precision, recall, or other evaluative metric than the initial global model, and thus federated learning server 402 may adapt a portion or all of a variation of global model 404, such as variation 406, to new global model 428. For example, forking the global model allows simultaneous execution and merging of models. Merging forked versions of the global model helps improve the global model more than picking one forked version of the model over the other. By merging models, the efficiency and speed of federated learning is increased over selecting one forked version of the global model over the other. Merging a forked model and the global model may lead to an increase in efficiency and/or speed. The increase may occur because, instead of one version of the model being selected in lieu of the other, a combination preserves the desirable aspects of both models.

The new merged version of the model may be optimal over the forked version or over the global model individually. For example, conventionally, federated learning systems may not fork the global model, opting instead to send the same global model to all participating clients. Forking the global model can help make federated learning more efficient. For example, forking the global model may help improve the efficiency limitations present in conventional federated learning. By adjusting parameters of the global model to generate forked versions of the global model, federated learning does not have to rely on a single global model and instead may reap the benefits of simultaneously training multiple forked versions of the global model. As such, the system may achieve the practical benefit of improving the efficiency of federated learning and thus reaching an optimal model at a faster rate than when conducting standard federated learning.

Figure 5:
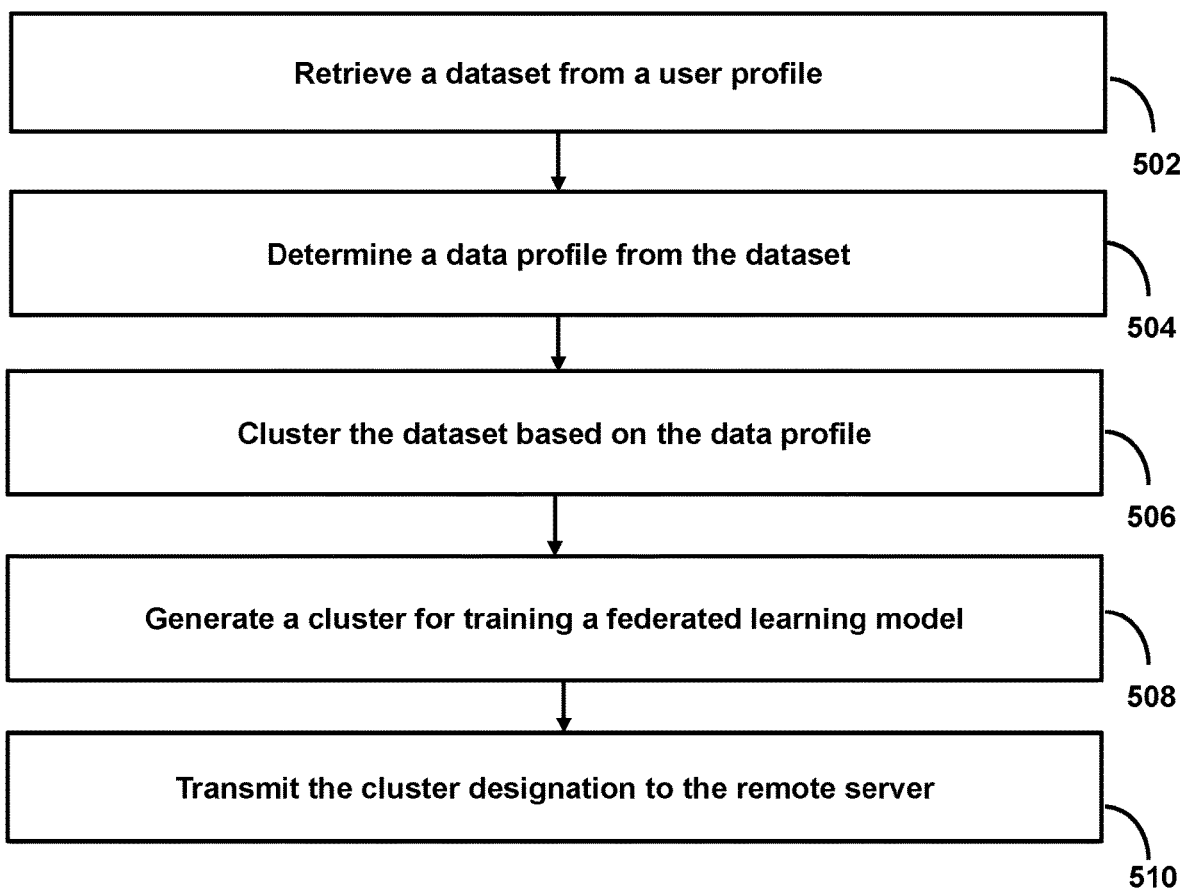
FIG. 5 shows a flowchart of the steps involved in utilizing data profiles for client clustering and selection in federated learning, in accordance with some embodiments.

FIG. 5 shows a flowchart of the steps involved in utilizing data profiles for client clustering and selection in federated learning, in accordance with one or more embodiments. For example, the system may use process 500 (e.g., as implemented on one or more system components described above) to cluster groups of similar client devices in order to improve the efficiency of federated learning.

At step 502, process 500 (e.g., using one or more components described above) may retrieve a dataset from a user profile on a local device. For example, the system may retrieve a dataset from a user profile, wherein the user profile is stored locally on a user device. For example, process 500 may retrieve a locally stored dataset that contains user information such as transaction data from a mobile phone. By doing so, the system may access local user data without transmitting sensitive data from the user device.

At step 504, process 500 (e.g., using one or more components described above) may determine a data profile from the dataset. For example, the system may determine, using a data profiler, a data profile from the dataset. For example, the system may determine, based on the attributes identified by the data profiler, that a user device may be committing fraudulent transactions. By doing so, the system may be able to create labels for user devices that help identify behaviors or attributes of the user device.

At step 506, process 500 (e.g., using one or more components described above) may cluster the dataset based on the data profile. For example, the system may cluster, using a clustering algorithm, a dataset based on the data profile. For example, the system may locally cluster certain features in a dataset such as suspicious transactions or abnormal transaction times on a user device. By doing so, the system may be able to group similar data in a dataset, which may help identify a larger overview of what is contained in a local dataset. Identifying a larger overview of what is contained in a local dataset may help in grouping user devices together based on certain features to increase the efficiency of federated learning.

In some embodiments, using the clustering algorithm may include finding similarities of data distributions in the dataset, adaptively weighting clustering criterion, ranking similarities, and generating a recommendation for clustering based on the ranking. For example, the system may determine similarities of data distributions in the dataset, adaptively weight a clustering criterion, rank the similarities based on the clustering criterion, and generate a clustering recommendation based on the ranking. For example, the system may determine similarities in transactions contained in a dataset stored locally on a user device. The system may determine similarities between two fraudulent transactions contained in a local dataset of transactions processed on a user device. The system may use a clustering algorithm and optimally cluster these transactions by weighting clustering criterion when clustering. By doing so, the system may preserve the privacy of datasets stored on user devices as the clustered information is never sent anywhere from the local device. Additionally, clustering locally on user devices increases the speed of federated learning as the server would be responsible for clustering datasets on each user device, whereas local clustering has fewer user device datasets to cluster.

In some embodiments, the system may use k-means clustering to determine the cluster. For example, the system may select a centroid for the dataset based on the data profile, determine centroids for a plurality of potential clusters, and determine that the dataset corresponds to the cluster designation based on a difference between the centroid of each of the centroids. For example, the system may use a k-means clustering algorithm to identify and locally cluster suspicious transactions conducted on a user device. By doing so, the system may be easily able to cluster large datasets and adapt to new and changing datasets on a user device. Furthermore, applying clustering algorithms to larger and changing datasets ensures that regardless of the size of a dataset on a local user device, clustering can still take place. Additionally, using k-means clustering locally on a user device may help to preserve privacy during federated learning as the contents of clusters may not be sent back to the federated learning server.

In some embodiments, the system may use a mean-shift clustering algorithm. For example, the system may assign data profiles to a plurality of potential clusters and compare the data profile to the data profiles to select the cluster from the plurality of potential clusters. For example, the system may use a mean-shift clustering algorithm in conjunction with the data profiles to determine clusters of similar user devices. For example, the system may assign data profiles to a cluster and compute centroids based on the identified clusters. After assigning data profiles to a cluster and computing the centroids, the system may update the location of new centroids and iterate the process of finding centroids to a higher density region. By doing so, the system may avoid a local minima problem when clustering (i.e., when the model falsely indicates that it is in a globally optimized state), model complex clusters of clients (e.g., when data profiles do not fit neatly into a category), and disregard outliers in the dataset. Furthermore, using mean-shift clustering locally on a user device may help to preserve privacy during federated learning as the contents of clusters may not be sent back to the federated learning server.

In some embodiments, the system may use density-based spatial clustering of applications with noise (DBSCAN) to determine the cluster. For example, the system may classify all data profile points in the dataset into core points or anomalies, delete the anomalies, and assign the cluster based on the core points. For example, the system may cluster data profile points according to a density-based method of clustering. The system may classify the data profiles into points, parse the points, and discard noise among the data profiles. The system may determine a group of data profiles that are close to a core point. The system may determine an additional group of data profiles that are on the border of a core point. By using DBSCAN to determine clusters of local datasets, the system may be able to determine clusters in scenarios where the clusters are shaped arbitrarily, that is, without an expected shape. Furthermore, using DBSCAN locally on a user device may help to preserve privacy during federated learning as the contents of clusters may not be sent back to the federated learning server.

In some embodiments, the system may use the file type in determining a data profile. For example, the system may identify a file type in the dataset, select a first file type of a plurality of file types for the data profile based on the file type, and export the data profile in the first file type. For example, the system may identify a delimited file (e.g., a comma-separated values file) and export the data profile identifying the file type for additional data profiling. By doing so, the system may more easily be able to integrate dissimilar datasets into a data profiler to better label datasets in order to cluster clients based on a similar data profile. Clustering clients based on a similar data profile may improve the efficiency of federated learning.

In some embodiments, the data profiler may generate a feature input, input the feature input into a neural network to generate an output, and select the data profile based on the output. For example, the system may generate a feature input based on the dataset, input the feature input into an input layer of a neural network, propagate the feature input to one or more hidden layers of the neural network to generate an output, and select the data profile based on the output. For example, the system may input a feature of a locally stored dataset into a neural network to determine the category or type of data associated. By doing so, the system may accurately identify a data profile associated with a locally stored dataset on a user device, which may help improve the efficiency of federated learning.

In some embodiments, the system may generate synthetic data and transmit the cluster designation of the synthetic data. For example, the system may generate synthetic data based on the dataset locally on the user device, label the synthetic data with the cluster designation, and transmit the synthetic data with the cluster designation. For example, the system may generate synthetic data based on a data label from the data profiler and transmit the data profile designation to the federated learning server. By doing so, the system may preserve user device privacy by using synthetic data to obfuscate sensitive data or fill in incomplete datasets. Furthermore, the system may be more efficient in federated learning as similar user devices can be referenced as a cluster.

In some embodiments, the system may run the data profiler locally on a user device. For example, the system may receive the data profiler from the remote server and store the data profiler locally on the user device. For example, the federated learning model may send the data profiler in conjunction with the global model for local training. By sending the data profiler with the global model, the system may preserve the privacy of the user device by not requiring the transmission of datasets for data profiling from the local user device.

At step 508, process 500 (e.g., using one or more components described above) may generate a cluster for training a federated learning model. For example, the system may generate a cluster designation for training a federated learning model, wherein the federated learning model is trained on a remote server. For example, process 500 may generate a cluster of user devices that have similar labels as identified by clustering the data contained in the local dataset in step 506. For example, process 500 may generate a cluster of user devices that all show signs of fraudulent activity. For example, the system may assess updates from a cluster of users conducting fraudulent transactions as more important for a model that identifies fraudulent transactions than data from users that are not conducting fraudulent transactions. By doing so, the system may be able to assess updates from groups of clients differently, which may lead to more efficient federated learning.

In some embodiments, the system may determine a hyper-parameter for training the federated learning model by incorporating the value in a gradient descent optimization algorithm. For example, the system may retrieve the data profile, retrieve labeled classified data profiles from the data profiler, compare the data profile to the labeled classified data profiles to determine a value, and use the value in a gradient descent optimization algorithm. For example, the system may use a value from a gradient descent optimization algorithm, run locally on the user device, to inform a hyper-parameter used to train the federated learning model. By doing so, the system may improve the hyper-parameters of the federated learning model, which may increase the efficiency of federated learning.

At step 510, process 500 (e.g., using one or more components described above) may transmit the cluster designation to the remote server. For example, the system may transmit the cluster designation to the remote server. For example, if local user data indicated multiple fraudulent transactions, then the system may transmit the cluster designation "fraudulent" to the federated learning server. By doing so, the system may identify groups of similar user devices without compromising privacy, which may allow for more efficient federated learning.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

Figure 6:
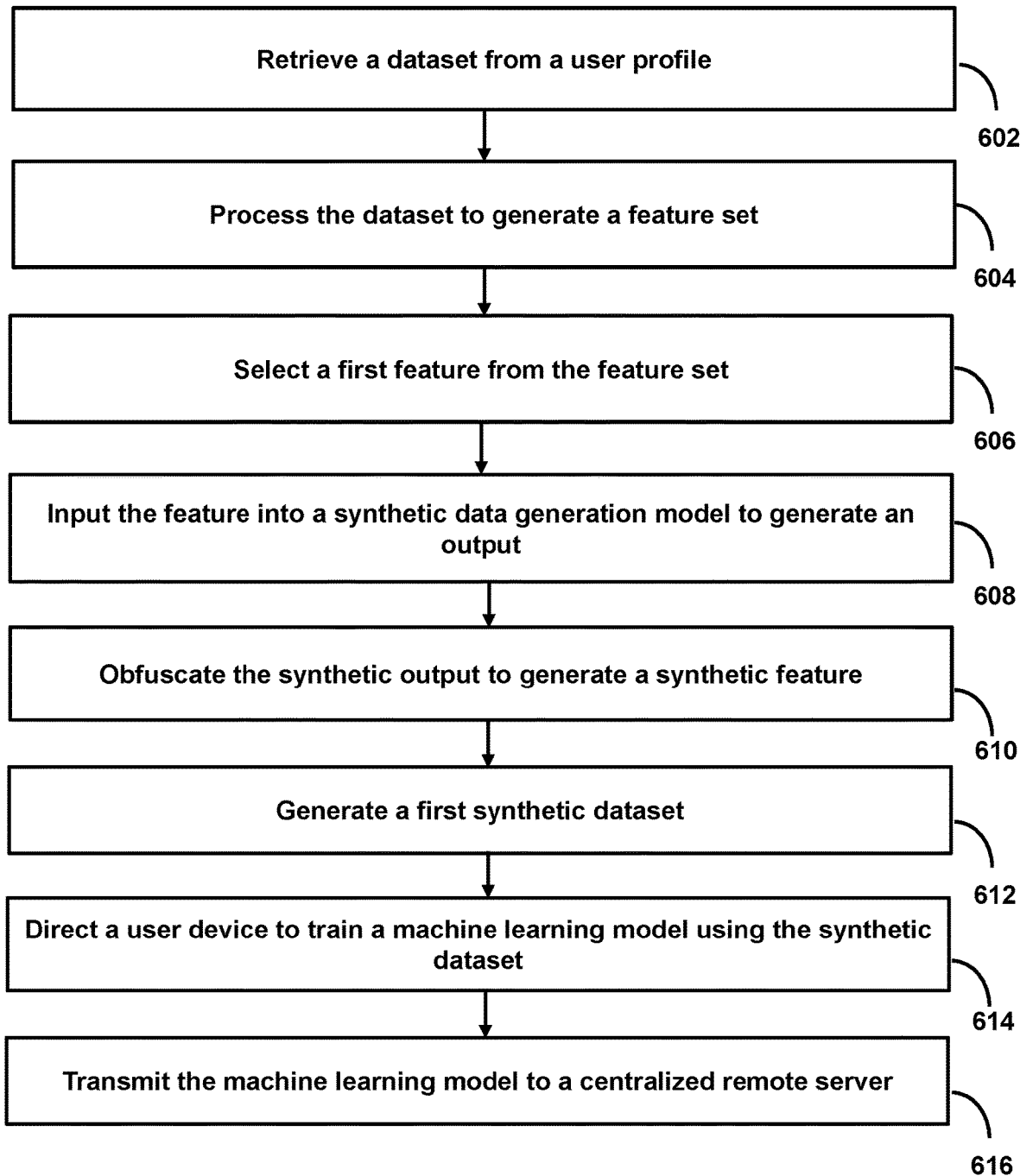
FIG. 6 shows a flowchart of the steps involved in conducting federated learning utilizing customer synthetic data models, in accordance with some embodiments.

FIG. 6 shows a flowchart of the steps involved in conducting federated learning utilizing customer synthetic data models, in accordance with one or more embodiments. For example, the system may use process 600 (e.g., as implemented on one or more system components described above) in order to generate synthetic data for local model training, which allows user devices with incomplete datasets or datasets with sensitive information to participate in federated learning without compromising privacy.

At step 602, process 600 (e.g., using one or more components described above) may retrieve a local dataset from a user profile on a user device. For example, the system may retrieve a dataset from a user profile, wherein the user profile is stored locally on a user device. For example, the system may retrieve a local dataset containing transaction history, email history, or call history from a user device. By doing so, the system may preserve the privacy of a user device by accessing datasets locally instead of transmitting them to another location.

At step 604, process 600 (e.g., using one or more components described above) may process the dataset to generate a feature set. For example, the system may process the dataset, by removing anomalies, incomplete data, or outliers, to generate a feature set. For example, a feature set may comprise data within the user profile that may be representative of the remaining data and used to generate synthetic data. For example, a feature set may include financial features such as name, address, or credit card number. By doing so, the system may avoid using real user data when training the local model, which may preserve user device privacy.

At step 606, process 600 (e.g., using one or more components described above) may select a first feature. For example, the system may select a first feature from the feature set. For example, a first feature may be a credit card number or an address. By selecting a first feature from the feature set, the system may identify fields that should be obfuscated or added using synthetic data generation.

At step 608, process 600 (e.g., using one or more components described above) may enter the first feature into a synthetic data generation model to generate synthetic data. For example, the system may input the first feature into a synthetic data generation model, wherein the synthetic data generation model generates a first synthetic output. For example, a first feature may be a credit card number. The credit card number feature may be used as input into a synthetic data generation model. The synthetic data generation model may assess the credit card number, preserve the first card provider identification numbers, and obfuscate the unique identifying card numbers. By doing so, the system may ensure that data used to train the local model does not contain sensitive information. Even though the contents of the datasets are never sent to the federated learning server, locally using sensitive information to train the model may reduce user device privacy.

In some embodiments, the system may input a second feature set to a synthetic generation model that produces a third synthetic feature. For example, the system may input a second feature into the synthetic data generation model, wherein the synthetic data generation model generates a second synthetic output and obfuscates the second synthetic output to generate a third synthetic feature, wherein the first synthetic dataset is further based on the third synthetic feature. For example, a feature called "address" may be used as input into a synthetic data generation model. The synthetic data generation model may obfuscate an entry for "address" by changing the numbers or letters in a street address. The altered address may be integrated with the first synthetic dataset to train a local model on a user device. By doing so, the system may preserve the privacy of sensitive information stored on user devices.

In some embodiments, the system may generate synthetic data for use in obfuscating natural language. For example, the system may determine a similar feature based on a manipulation of human language in the first feature and determine the first synthetic output based on the similar feature. For example, an entry in a dataset storing calendar information may be "met with manager at 3 pm." The synthetic data generator may be configured to obfuscate the details of calendar descriptions and output "afternoon meeting." By doing so, the system may help improve the privacy of certain types of language data on user devices when training a local model.

At step 610, process 600 (e.g., using one or more components described above) may obfuscate synthetic output to generate a first synthetic feature. For example, the system may obfuscate the first synthetic output to generate a first synthetic feature. For example, the first feature may be credit card information. Once the credit card information is input into the synthetic data generation model, the output may be used as a first synthetic feature during federated learning. By doing so, the system may use sensitive data on a user device with an additional layer of privacy on top of not transmitting the sensitive data to the federated learning server.

In some embodiments, the system may use encryption to obfuscate the synthetic output. For example, the system may determine a secret key based on a random string of bits, determine an encryption algorithm, and encrypt the first synthetic output by using the secret key and the encryption algorithm to obfuscate the first synthetic output. For example, in highly sensitive environments, such as environments that concern confidential information, trade secrets, or national security, the system may encrypt the synthetic data output prior to training the model locally. Encryption is especially important if synthetic data generation necessitates the transfer of data, as is the case if synthetic data generation takes place off of the user device. By doing so, the system may help ensure privacy when generating synthetic data even if data must be transmitted off the device.

In some embodiments, the system may obfuscate sensitive user data using tokenization techniques. For example, the system may detect a first text string in the first synthetic output, determine that the first text string comprises personally identifiable information (PII), and in response to determining that the first text string comprises PII, replace the first text string with a second text string. For example, the synthetic data generator may convert PII into a token. For example, if a credit card number is input into the synthetic data generator, the output may be a token based on the credit card number. By doing so, the system may remove any identifying information from the data input into the synthetic data generator while maintaining a reference to the data asset. Furthermore, by tokenizing certain information, the system may preserve user device privacy while helping developers of federated learning models debug issues that occur during federated learning, as there will be data associated with the token that can be accessed if necessary.

In some embodiments, the system may identify PII in a dataset stored locally on a user device. For example, the system may compare the first text string to a list of known instances of PII corresponding to the user device and, based on comparing the first text string to the list of known instances of PII corresponding to the user device, determine that the first text string corresponds to a first known instance of PII in the list of known instances of PII. For example, the system may identify a social security number text string as PII. By doing so, the system may accurately identify and obfuscate PII in a dataset.

In some embodiments, the system may correlate a PII text string with a text string contained in a dataset stored locally on a user device. For example, the system may retrieve a PII text string corresponding to the user device, compare the first text string to the PII text string, and determine that the first text string corresponds to the PII text string. For example, the system may retrieve a PII text string containing a credit card number and compare the text string to a credit card number stored locally on a user device, thereby correlating the first text string to the PII text string. By doing so, the system may identify data that needs to be processed with the synthetic data generator to preserve the privacy of user devices.

In some embodiments, the system may correlate a text string from a dataset stored locally on a user device to a characteristic of the first text string. For example, the system may determine a first characteristic in the first text string and determine a probability that the first text string corresponds to PII based on the first characteristic. For example, the system may correlate a characteristic such as social security number with a string storing a social security number in a dataset on a local user device. By doing so, the system may correlate categories of data with PII, which may make it easier for the synthetic data generator to obfuscate PII.

In some embodiments, the system may replace a text string with a synthetic version of the data that matches the data format. For example, the system may determine a first characteristic in the first text string, determine a data format of the first characteristic, select the second text string based on the data format, and encrypt the first synthetic output by using a secret key and an encryption algorithm to obfuscate the first synthetic output. For example, the system may identify a social security number as a characteristic of the text string. The system may determine the data format of the characteristic as a 10-digit social security number. The system may then obfuscate the 10-digit social security number with a random 10-digit number. By doing so, the system may identify patterns of PII to select and generate corresponding synthetic data, thereby adding an additional layer to user device privacy.

In some embodiments, the system may use data masking to protect sensitive information stored locally on a user device. For example, the system may detect a first text string in the first synthetic output, detect a first character in the first text string, and generate a substitute text string by removing the first character from the first text string. For example, the system may convert a name by changing one or more characters contained in a text string. By doing so, the system may preserve user privacy by obfuscating the local data used to train the local model.

At step 612, process 600 (e.g., using one or more components described above) may generate a synthetic dataset based on a synthetic feature. For example, the system may generate a first synthetic dataset based on the first synthetic feature. For example, the system may generate a fake credit card number based on a real credit card number stored in a local dataset on a user device. By doing so, the system may further preserve the privacy of the user device when training the local model.

In some embodiments, the system may generate a second synthetic output to include in the synthetic dataset. For example, the system may generate a second synthetic output based on the first feature and obfuscate the second synthetic output to generate a second synthetic feature, wherein the first synthetic dataset is further based on the second synthetic feature. For example, the system may generate, using the synthetic data generator, a first and a last name if none are provided in the locally stored dataset. The system may include the synthetically generated first and last name in the synthetic dataset. By doing so, the system may synthetically generate more than one feature in the synthetic dataset, which may help preserve the privacy of the user device.

In some embodiments, the system may use agent-based modeling to generate synthetic data. For example, the system may determine a plurality of agent outputs based on the first feature and aggregate the plurality of agent outputs into the first synthetic output. For example, the system may use agent-based modeling to generate synthetic transaction data for a user device that does not have any or enough transaction data. By doing so, the system may include the user device in federated learning even if the user device does not have enough or any of the required training data.

In some embodiments, the system may use generative models to determine the first synthetic output. For example, the system may determine a distribution of data based on the first feature and determine the first synthetic output based on a likelihood that the distribution of data corresponds to the first synthetic output. For example, the system may use a generative model to determine the probability of a dataset containing a feature. For example, a dataset on a user device may contain emails categorized into spam and not spam. The system may contribute to spam filtering and organization based on a generative model. For example, the system may mark an email with no designation as spam or not spam. By doing so, the system may allow clients with incomplete or empty datasets to participate in training the local model.

In some embodiments, for example, the system may use a generative adversarial network to determine the first synthetic output. For example, the system may determine, using a first generative model, a first distribution of data based on the first feature; determine, using a second generative model, a second distribution of data based on the first feature; compare the first distribution to the second distribution; select the first distribution based on comparing the first distribution to the second distribution; and determine the first synthetic output based on a likelihood that the first distribution of data corresponds to the first synthetic output. For example, the system may use a generative adversarial network to populate missing data fields in local datasets on a user device. By doing so, the system may allow clients with incomplete or empty datasets to participate in training the local model.

At step 614, process 600 (e.g., using one or more components described above) may instruct a user device to use the synthetic dataset for client training. For example, the system may direct a user device to train a machine learning model using the first synthetic dataset. For example, the federated learning server may instruct a user device to train a global model and locally generate synthetic data if a dataset is incomplete or contains highly sensitive information. The user device may have an incomplete dataset or a dataset that contains highly sensitive information and subsequently use a synthetic data generator to locally generate data that obfuscates or populates the dataset. By doing so, the system may allow user devices with incomplete or highly sensitive information to train local models to help in federated learning.

At step 616, process 600 (e.g., using one or more components described above) may send the machine learning model back to the centralized remote server for use in federated learning. For example, the system may transmit the machine learning model to a centralized remote server from the user device for training a federated learning model. For example, the centralized remote server may include a federated learning server. The federated learning server may send a global model to a user device. The global model may be a machine learning model. The global model, once on the user device, may be referred to as a local model. The user device may train the local model using synthetic data when necessary to preserve privacy and meet the data training requirements set by the federated learning server. Upon completion of training the local model, the user device may generate an update. The update generated by the user device may include a machine learning model for transmission. The machine learning model for transmission may include changes to the machine learning model that would improve the model according to a locally deployed optimization algorithm. The changes included in the machine learning model for transmission may be referred to as an update. The update from the user device may be combined with other updates from additional user devices in a process called aggregation on the federated learning server. At the end of aggregation, the federated learning server may use the collated updates to further optimize the global model. By doing so, the system may use synthetic data to train a machine learning model without compromising user device privacy and ensure that as many user devices as possible are eligible to participate in federated learning.

In some embodiments, the system may use fine tuning on the user device. For example, when the model is received by the user device, the local data may inform what data needs to be supplemented with the synthetic data. Furthermore, by fine tuning the synthetic data requirements, some real user data may be preserved when training the model thereby increasing the authenticity of the data used to train the model. Increasing the data authenticity may lead to improvements in the efficiency of federated learning.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

Figure 7:
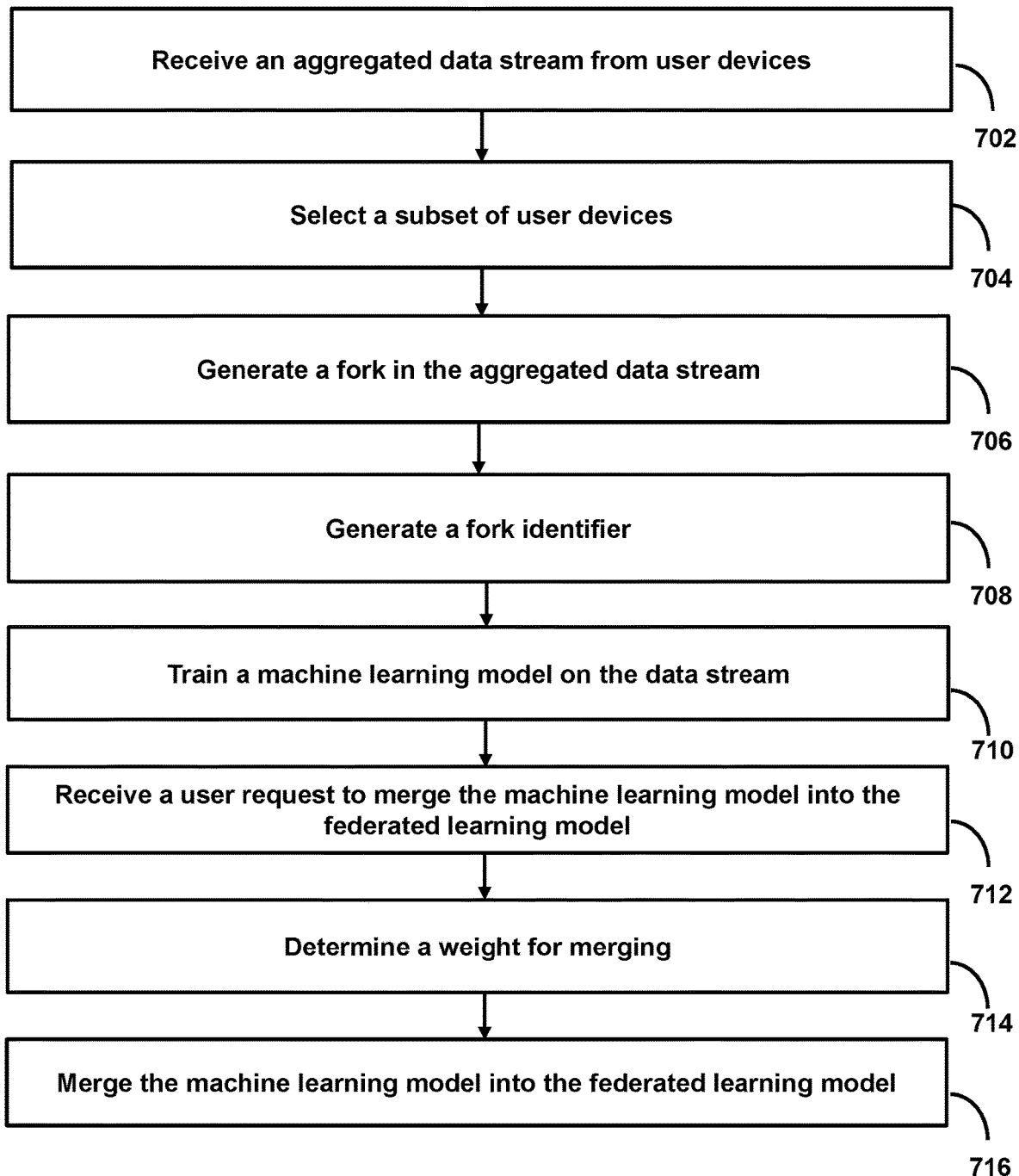
FIG. 7 shows a flowchart of the steps involved in utilizing data profiles for client clustering and selection in federated learning, in accordance with some embodiments.

FIG. 7 shows a flowchart of the steps involved in utilizing data profiles for client clustering and selection in federated learning, in accordance with one or more embodiments. For example, the system may use process 700 (e.g., as implemented on one or more system components described above) in order to make a federated learning model more refined for specific use cases, such as in fraud detection and increasing the speed at which the model is trained. Additionally, by detecting anomalous client data, the model degradation and training divergence in the model can be reduced.

At step 702, process 700 (e.g., using one or more components described above) may receive a data stream from user devices. For example, the system may receive, by a federated learning model being executed on a remote server, a first aggregated data stream, wherein the first aggregated data stream receives data from a plurality of user devices, wherein the federated learning model is trained on the first aggregated data stream. For example, the system may receive data streams from multiple user devices that completed a round of training for federated learning. By doing so, the system may be able to aggregate the data streams from the user devices.

At step 704, process 700 (e.g., using one or more components described above) may select a group of user devices. For example, the system may select a first subset of the plurality of user devices. For example, the system may select user devices that sent data streams within a certain timeframe. By doing so, the system may isolate the data streams from a subset of user devices for further use in federated learning.

In some embodiments, the system may receive a user request that specifies a cluster designation, determines cluster designations for devices, and compares cluster designations. For example, the system may receive a third user request, wherein the third user request specifies a first cluster designation, determines respective cluster designations for each of the plurality of user devices, and compares the first cluster designation to each of the respective cluster designations. For example, the system may interact with a specific set of user devices determined by the cluster designations and referenced by the cluster designation. For example, devices that are suspected of participating in fraudulent activity may be referred to by their cluster designation. For example, a cluster designation from a user request may be for user devices that have the cluster designation "fraudulent devices," which would refer to the group of user devices identified by the system to have potentially participated in fraudulent activity. By doing so, the system may address specific groups of user devices, which may be helpful in specific training scenarios, such as fraud detection.

At step 706, process 700 (e.g., using one or more components described above) forks the aggregated data stream into multiple versions based on the data streams from the first subset of user devices. For example, the system may generate a first fork in the first aggregated data stream by generating a second aggregated data stream at a first time, wherein the second aggregated data stream receives data from the first subset of the plurality of user devices. For example, the system may create a version of the aggregated data stream that has different parameters than the main aggregated data stream. By doing so, the system may vary the aggregated data stream based on the data streams from the first subset of user devices, allowing for more flexibility when training the model from the federated learning model.

In some embodiments, the system may generate synthetic data and transmit the synthetic data in an aggregated data stream. For example, the system may generate synthetic data based on the data from the first subset of the plurality of user devices and transmit the synthetic data in the second aggregated data stream. For example, the system may generate synthetic data based on a group of user devices suspected of fraudulent activity. For example, the federated learning model may send a synthetic data generator to a specific group of user devices. Based on the instructions from the federated learning model, the user device may generate synthetic data that is aligned with a cluster designation. For example, if the federated learning model sent the synthetic data generator to a group of client devices suspected of participating in fraudulent activity, the synthetic data generator may generate fraudulent-appearing data to train the machine learning model. Based on the training, the user device may send portions or all of the synthetic data back to the federated learning model for debugging purposes, testing, or optimization purposes. By doing so, the system may improve the data stored on user devices in relation to training a shared machine learning model. Additionally, the system may maximize the number of user devices that can participate in federated learning by reducing the number of user devices excluded due to incomplete or missing data.

At step 708, process 700 (e.g., using one or more components described above) may identify a fork based on the time and subset of user devices. For example, the system may generate a first fork identifier based on the first time and the first subset of the plurality of user devices. For example, a fork identifier may be "fork 1," which may be associated with a set of user devices active in the morning. By doing so, the system may reference specific versions of the aggregated data stream for use later in the federated learning process.

In some embodiments, the system may determine a device identifier and determine a fork identifier based on the device identifier. For example, the system may determine a device identifier for each user device in the first subset of user devices and determine the first fork identifier based on the device identifier for each user device in the first subset of user devices. For example, the system may determine device identifiers for each user device in a subset of user devices. For example, the device identifier may include the device type (e.g., mobile device, desktop workstation, or tablet). The fork identifier may be based on the device identifier. For example, the fork identifier may indicate a fork targeted directly to mobile devices. By doing so, the system may optimize the first aggregated data stream for a specific group of user devices. Optimizing the first aggregated data stream for a group of user devices may increase the efficiency or accuracy of federated learning.

At step 710, process 700 (e.g., using one or more components described above) may train a machine learning model based on the aggregated data stream. For example, the system may train a first machine learning model on the second aggregated data stream. For example, the system may train a machine learning model by sending the machine learning model to user devices to run the machine learning models with data stored locally on a user device. By doing so, the system may improve the aggregated data stream over time, thereby refining the machine learning model.

At step 712, process 700 (e.g., using one or more components described above) may merge the machine learning model into the federated learning model. For example, the system may receive a first user request to merge the first machine learning model into the federated learning model. For example, the system may use aspects of the machine learning model to integrate with the aggregated data stream on the federated learning model to improve the aggregated data stream on the federated learning model for the next training iterations. By doing so, the system may increase the rate at which the machine learning model on the federated learning model is trained.

In some embodiments, the system may receive a user request to create a second aggregated data stream based on the time of the user request and the time of receipt of the user request. For example, the system may receive a second user request, wherein the second user request requests creation of the second aggregated data stream, determines a time of receipt of the second user request, and determines the first time based on the time of receipt of the second user request. For example, the federated learning model may obtain an indication that a user (e.g., a developer) requests an additional fork. Based on the time that the user requests the additional fork, the federated learning model may determine the first time based on the time the request was received. By doing so, the system may ensure that the first time corresponds to a user request and the aggregated data stream is generated only when necessary.

At step 714, process 700 (e.g., using one or more components described above) may determine a weight to merge with the federated learning model. For example, the system may, in response to the first user request, determine a first weight for merging the first machine learning model into the federated learning model based on the first fork identifier. For example, when training the machine learning model, the user device may determine specific weights that are effective from the second aggregated data stream associated with the first fork identifier. By doing so, the system may develop a better version of the aggregated data stream.

In some embodiments, the system may adjust the weight of the first aggregated data stream based on the time difference between a forked version of the model and the original version of the model. For example, the system may determine a current time, determine a difference between the current time and the first time, and adjust the first weight based on the difference. For example, the system may determine that there is a difference between the current time and the first time. Subsequently, the system may change the weights of the first aggregated data stream based on how long ago the fork was created. By doing so, the system may account for all forks of the first aggregated data stream.

In some embodiments, the system may determine the number of devices and adjust the weight for the second aggregated data stream accordingly. For example, the system may determine a number of user devices in the first subset and adjust the first weight based on the difference. For example, the system may increase the weights of the second aggregated data stream based on how many devices are in the subset. By doing so, the system may be able to optimize the second aggregated data stream to send to devices in the subset.

In some embodiments, the system may increase the weight for the second aggregated data stream based on the volume of data used to train the second aggregated data stream. For example, the system may determine a volume of data in the second aggregated data stream based on the first fork identifier and adjust the first weight based on the volume. For example, if the second aggregated data stream is sent to a small number of user devices, the weights may be adjusted to compensate for the small number of user devices. By doing so, the system may adjust the second aggregated data stream to account for the small number of user devices.

At step 716, process 700 (e.g., using one or more components described above) may select an attribute from the machine learning model to merge with the aggregated data stream on the federated learning model. For example, the system may merge the first machine learning model into the federated learning model based on the first weight. For example, the system may integrate an effective weight into the aggregated data stream on the federated learning model. By doing so, the system may increase the efficiency of federated learning.

In some embodiments, the system may generate an output from the first machine learning model, modify the output, and use the modified output as an input to the federated learning model. For example, the system may generate a first output from the first machine learning model, modify the first output based on the first weight to generate a second output, and input the second output into the federated learning model. For example, the system may generate an output from the first machine learning model. The output may comprise updates from the user device. The first update from the user device may comprise or be modified by the first weight to generate a second update. The second update may be used as input into the federated learning model for use in optimizing the first aggregated data stream. By doing so, the system may optimize the federated learning model for further federated learning iterations.

In some embodiments, the system may generate an output from the machine learning model, and based on the accuracy of the output, generate a recommendation to merge the first machine learning model with the federated learning model. For example, the system may generate a first output from the first machine learning model, determine an accuracy of the first output, compare the accuracy to a threshold accuracy, and generate a recommendation to merge the first machine learning model into the federated learning model based on the accuracy exceeding the threshold accuracy. For example, the user device may generate an output based on training the machine learning model locally. Attributes of the output may be sent to a federated learning model. The federated learning model may assess the accuracy of the machine learning model when using the outputted weights. Based on the accuracy of the machine learning model, the system may generate a recommendation to merge attributes of the machine learning model with the first aggregated data stream on the federated learning model. By doing so, the system may increase the speed of federated learning as, based on the accuracy of the output, the system can merge effective attributes of the machine learning model with the second aggregated data stream.

In some embodiments, the system may merge the machine learning model into the federated learning model based on accuracy. For example, the system may determine the first weight for merging the first machine learning model into the federated learning model, further based on the accuracy. For example, the system may increase the likelihood of adjusting the first weight in the first aggregated data stream into the federated learning model if the accuracy of the weights given by the machine learning output is high. By doing so, the system may increase the efficiency of federated learning as machine learning outputs with high accuracy increase the likelihood that merging would result in more efficient federated learning.

In some embodiments, the system may transmit a data profiler to multiple user devices and receive cluster designations for the user devices. For example, the system may transmit a respective data profiler to each of the plurality of user devices and receive the respective cluster designations from the respective data profiler. For example, the federated learning model may send a data profiler program to a user device. The user device may use the data profiler to ascertain a data profile for the datasets stored locally on the user device. The user device may send the data profile back to the federated learning model. By doing so, the system may easily identify characteristics about a user device without compromising user device privacy. Furthermore, ascertaining attributes of the user device may be beneficial in determining forking parameters.

In some embodiments, the system may use a machine learning model with swappable post layers as a data profile. For example, a machine learning model with swappable post layers my inherently contain statistics and predictions about a dataset stored locally on a user device.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving, by a federated learning model being executed on a remote server, a first aggregated data stream, wherein the first aggregated data stream receives data from a plurality of user devices, wherein the federated learning model is trained on the first aggregated data stream; selecting a first subset of the plurality of user devices; generating a first fork in the first aggregated data stream by generating a second aggregated data stream at a first time, wherein the second aggregated data stream receives data from the first subset of the plurality of user devices; generating a first fork identifier based on the first time and the first subset of the plurality of user devices; training a first machine learning model on the second aggregated data stream; receiving a first user request to merge the first machine learning model into the federated learning model; in response to the first user request, determining a first weight for merging the first machine learning model into the federated learning model based on the first fork identifier; and merging the first machine learning model into the federated learning model based on the first weight.

2. The method of the preceding embodiment, wherein merging the first machine learning model into the federated learning model based on the first weight further comprises: generating a first output from the first machine learning model; modifying the first output based on the first weight to generate a second output; and inputting the second output into the federated learning model.

3. The method of any one of the preceding embodiments, further comprising: receiving a second user request, wherein the second user request requests creation of the second aggregated data stream; determining a time of receipt of the second user request; and determining the first time based on the time of receipt of the second user request.

4. The method of any one of the preceding embodiments, wherein generating the first fork identifier based on the first time and the first subset of the plurality of user devices further comprises: determining a device identifier for each user device in the first subset of user devices; and determining the first fork identifier based on the device identifier for each user device in the first subset of user devices.

5. The method of any one of the preceding embodiments, wherein selecting the first subset of the plurality of user devices further comprises: receiving a third user request, wherein the third user request specifies a first cluster designation; determining respective cluster designations for each of the plurality of user devices; and comparing the first cluster designation to each of the respective cluster designations.

6. The method of any one of the preceding embodiments, wherein determining respective cluster designations for each of the plurality of user devices further comprises: transmitting a respective data profiler to each of the plurality of user devices; and receiving the respective cluster designations from the respective data profiler.

7. The method of any one of the preceding embodiments, wherein determining the first weight for merging the first machine learning model into the federated learning model based on the first fork identifier further comprises: determining a current time; determining a difference between the current time and the first time; and adjusting the first weight based on the difference.

8. The method of any one of the preceding embodiments, wherein determining the first weight for merging the first machine learning model into the federated learning model based on the first fork identifier further comprises: determining a number of user devices in the first subset; and adjusting the first weight based on the number of user devices.

9. The method of any one of the preceding embodiments, wherein determining the first weight for merging the first machine learning model into the federated learning model based on the first fork identifier further comprises: determining a volume of data in the second aggregated data stream based on the first fork identifier; and adjusting the first weight based on the volume.

10. The method of any one of the preceding embodiments, further comprising: generating a first output from the first machine learning model; determining an accuracy of the first output; comparing the accuracy to a threshold accuracy; and generating a recommendation to merge the first machine learning model into the federated learning model based on the accuracy exceeding the threshold accuracy.

11. The method of any one of the preceding embodiments, wherein determining the first weight for merging the first machine learning model into the federated learning model is further based on the accuracy.

12. The method of any one of the preceding embodiments, wherein generating the second aggregated data stream comprises: generating synthetic data based on the data from the first subset of the plurality of user devices; and transmitting the synthetic data in the second aggregated data stream.

13. The method of any one of the preceding embodiments, further comprising: retrieving a dataset from a user profile, wherein the user profile is stored locally on a user device; processing the dataset, by removing anomalies, incomplete data, or outliers, to generate a feature set; selecting a first feature from the feature set; inputting the first feature into a synthetic data generation model, wherein the synthetic data generation model generates a first synthetic output; obfuscating the first synthetic output to generate a first synthetic feature; generating a first synthetic dataset based on the first synthetic feature; directing a user device to train a machine learning model using the first synthetic dataset; and transmitting the machine learning model to a centralized remote server from the user device for training a federated learning model.

14. The method of any one of the preceding embodiments, further comprising: generating a second synthetic output based on the first feature; and obfuscating the second synthetic output to generate a second synthetic feature, wherein the first synthetic dataset is further based on the second synthetic feature.

15. The method of any one of the preceding embodiments, further comprising: inputting a second feature into the synthetic data generation model, wherein the synthetic data generation model generates a second synthetic output; and obfuscating the second synthetic output to generate a third synthetic feature, wherein the first synthetic dataset is further based on the third synthetic feature.

16. The method of any one of the preceding embodiments, wherein generating the first synthetic output comprises: determining a plurality of agent outputs based on the first feature; and aggregating the plurality of agent outputs into the first synthetic output.

17. The method of any one of the preceding embodiments, wherein generating the first synthetic output comprises: determining a distribution of data based on the first feature; and determining the first synthetic output based on a likelihood that the distribution of data corresponds to the first synthetic output.

18. The method of any one of the preceding embodiments, wherein generating the first synthetic output comprises: determining, using a first generative model, a first distribution of data based on the first feature; determining, using a second generative model, a second distribution of data based on the first feature; comparing the first distribution to the second distribution; selecting the first distribution based on comparing the first distribution to the second distribution; and determining the first synthetic output based on a likelihood that the first distribution of data corresponds to the first synthetic output.

19. The method of any one of the preceding embodiments, wherein generating the first synthetic output comprises: determining a similar feature based on a manipulation of human language in the first feature; and determining the first synthetic output based on the similar feature.

20. The method of any one of the preceding embodiments, wherein obfuscating the first synthetic output to generate a first synthetic feature comprises: determining a secret key based on a random string of bits; determining an encryption algorithm; and encrypting the first synthetic output by using the secret key and the encryption algorithm to obfuscate the first synthetic output.

21. The method of any one of the preceding embodiments, wherein obfuscating the first synthetic output to generate a first synthetic feature comprises: detecting a first text string in the first synthetic output; determining that the first text string comprises personally identifiable information (PII); and in response to determining that the first text string comprises PII, replacing the first text string with a second text string.

22. The method of any one of the preceding embodiments, wherein determining that the first text string comprises PII comprises: comparing the first text string to a list of known instances of PII corresponding to the user device; and based on comparing the first text string to the list of known instances of PII corresponding to the user device, determining that the first text string corresponds to a first known instance of PII in the list of known instances of PII.

23. The method of any one of the preceding embodiments, wherein determining that the first text string comprises PII comprises: retrieving a PII text string corresponding to the user device; comparing the first text string to the PII text string; and determining that the first text string corresponds to the PII text string.

24. The method of any one of the preceding embodiments, wherein determining that the first text string comprises PII comprises: determining a first characteristic in the first text string; and determining a probability that the first text string corresponds to PII based on the first characteristic.

25. The method of any one of the preceding embodiments, wherein replacing the first text string with the second text string further comprising: determining a first characteristic in the first text string; determining a data format of the first characteristic; selecting the second text string based on the data format; and encrypting the first synthetic output by using a secret key and an encryption algorithm to obfuscate the first synthetic output.

26. The method of any one of the preceding embodiments, wherein obfuscating the first synthetic output to generate a first synthetic feature comprises: detecting a first text string in the first synthetic output; detecting a first character in the first text string; and generating a substitute text string by removing the first character from the first text string.

27. The method of any one of the preceding embodiments, further comprising: retrieving a dataset from a user profile, wherein the user profile is stored locally on a user device; determining, using a data profiler, a data profile from the dataset; clustering, using a clustering algorithm, the dataset based on the data profile; generating a cluster designation for training a federated learning model, wherein the federated learning model is trained on a remote server; and transmitting the cluster designation to the remote server.

28. The method of any one of the preceding embodiments, wherein using the clustering algorithm comprises: determining similarities of data distributions in the dataset; adaptively weighting a clustering criterion; ranking the similarities based on the clustering criterion; and generating a clustering recommendation based on the ranking.

29. The method of any one of the preceding embodiments, further comprising determining a hyper-parameter for training the federated learning model by: retrieving the data profile; retrieving labeled classified data profiles from the data profiler; comparing the data profile to the labeled classified data profiles to determine a value; and using the value in a gradient descent optimization algorithm.

30. The method of any one of the preceding embodiments, wherein clustering, using the clustering algorithm, the dataset based on the data profile further comprises: selecting a centroid for the dataset based on the data profile; determining centroids for a plurality of potential clusters; and determining the dataset corresponds to the cluster designation based on a difference between the centroid and each of the centroids.

31. The method of any one of the preceding embodiments, wherein the clustering algorithm comprises: assigning data profiles to a plurality of potential clusters; and comparing the data profile to the data profiles to select the cluster from the plurality of potential clusters.

32. The method of any one of the preceding embodiments, wherein the clustering algorithm comprises: classifying all data profile points in the dataset into core points or anomalies; deleting the anomalies; and assigning the cluster based on the core points.

33. The method of any one of the preceding embodiments, wherein determining the data profile from the dataset further comprises: identifying a file type in the dataset; selecting a first file type of a plurality of file types for the data profile based on the file type; and exporting the data profile in the first file type.

34. The method of any one of the preceding embodiments, wherein determining the data profile from the dataset further comprises: generating a feature input based on the dataset; inputting the feature input into an input layer of a neural network; propagating the feature input to one or more hidden layers of the neural network to generate an output; and selecting the data profile based on the output.

35. The method of any one of the preceding embodiments, further comprising: generating synthetic data based on the dataset locally on the user device; labeling the synthetic data with the cluster designation; and transmitting the synthetic data with the cluster designation.

36. The method of any one of the preceding embodiments, further comprising: receiving the data profiler from the remote server; and storing the data profiler locally on the user device.

37. A tangible, non-transitory, machine-readable medium storing instructions that, when executed by a data processing apparatus, cause the data processing apparatus to perform operations comprising those of any of embodiments 1-36.

38. A system comprising one or more processors; and memory storing instructions that, when executed by the processors, cause the processors to effectuate operations comprising those of any of embodiments 1-36.

39. A system comprising means for performing any of embodiments 1-36.

What is claimed is:

1. A system for preserving user privacy while generating high-quality training data for federated learning models, the system comprising:
    one or more processors; and
    a non-transitory computer readable medium having instructions recorded thereon that when executed by the one or more processors cause operations comprising:
        retrieving a dataset from a user profile, wherein the user profile is stored locally on a user device;
        processing the dataset, by removing anomalies, incomplete data, or outliers, to generate a feature set locally on the user device;
        selecting a first feature from the feature set, wherein the first feature is real user data on the local user device to be synthetically generated;
        inputting the first feature into a synthetic data generation model, wherein the synthetic data generation model generates a first synthetic output based on real user data on the local user device;
        obfuscating the first synthetic output to generate a first synthetic feature, wherein obfuscation techniques involve replacing personally identifiable information with synthetic data;
        generating a first synthetic dataset based on the first synthetic feature;
        directing a user device to train a machine learning model using the first synthetic dataset; and
        transmitting the machine learning model to a centralized remote server for training a federated learning model.

2. A method for preserving user privacy while generating high-quality training data for federated learning models, the method comprising:
    retrieving a dataset from a user profile, wherein the user profile is stored locally on a user device;
    processing the dataset, by removing anomalies, incomplete data, or outliers, to generate a feature set;
    selecting a first feature from the feature set;
    inputting the first feature into a synthetic data generation model, wherein the synthetic data generation model generates a first synthetic output;
    obfuscating the first synthetic output to generate a first synthetic feature;
    generating a first synthetic dataset based on the first synthetic feature;
    directing a user device to train a machine learning model using the first synthetic dataset; and
    transmitting the machine learning model to a centralized remote server from the user device for training a federated learning model.

3. The method of claim 2, further comprising:
    generating a second synthetic output based on the first feature; and
    obfuscating the second synthetic output to generate a second synthetic feature, wherein the first synthetic dataset is further based on the second synthetic feature.

4. The method of claim 2, further comprising:
    inputting a second feature into the synthetic data generation model, wherein the synthetic data generation model generates a second synthetic output; and
    obfuscating the second synthetic output to generate a third synthetic feature, wherein the first synthetic dataset is further based on the third synthetic feature.

5. The method of claim 2, wherein generating the first synthetic output comprises:
    determining a plurality of agent outputs based on the first feature; and
    aggregating the plurality of agent outputs into the first synthetic output.

6. The method of claim 2, wherein generating the first synthetic output comprises:
    determining a distribution of data based on the first feature; and
    determining the first synthetic output based on a likelihood that the distribution of data corresponds to the first synthetic output.

7. The method of claim 4, wherein generating the first synthetic output comprises:
    determining, using a first generative model, a first distribution of data based on the first feature;
    determining, using a second generative model, a second distribution of data based on the first feature;
    comparing the first distribution to the second distribution;
    selecting the first distribution based on comparing the first distribution to the second distribution; and
    determining the first synthetic output based on a likelihood that the first distribution of data corresponds to the first synthetic output.

8. The method of claim 4, wherein generating the first synthetic output comprises:
    determining a similar feature based on a manipulation of human language in the first feature; and
    determining the first synthetic output based on the similar feature.

9. The method of claim 2, wherein obfuscating the first synthetic output to generate a first synthetic feature comprises:
    determining a secret key based on a random string of bits;
    determining an encryption algorithm; and
    encrypting the first synthetic output by using the secret key and the encryption algorithm to obfuscate the first synthetic output.

10. The method of claim 2, wherein obfuscating the first synthetic output to generate a first synthetic feature comprises:
- detecting a first text string in the first synthetic output;
- determining that the first text string comprises personally identifiable information (PII); and
- in response to determining that the first text string comprises PII, replacing the first text string with a second text string.

11. The method of claim 10, wherein determining that the first text string comprises PII comprises:
- comparing the first text string to a list of known instances of PII corresponding to the user device; and
- based on comparing the first text string to the list of known instances of PII corresponding to the user device, determining that the first text string corresponds to a first known instance of PII in the list of known instances of PII.

12. The method of claim 10, wherein determining that the first text string comprises PII comprises:
- retrieving a PII text string corresponding to the user device;
- comparing the first text string to the PII text string; and
- determining that the first text string corresponds to the PII text string.

13. The method of claim 10, wherein determining that the first text string comprises PII comprises:
- determining a first characteristic in the first text string; and
- determining a probability that the first text string corresponds to PII based on the first characteristic.

14. The method of claim 10, wherein replacing the first text string with the second text string further comprising:
- determining a first characteristic in the first text string;
- determining a data format of the first characteristic;
- selecting the second text string based on the data format; and
- encrypting the first synthetic output by using a secret key and an encryption algorithm to obfuscate the first synthetic output.

15. The method of claim 2, wherein obfuscating the first synthetic output to generate a first synthetic feature comprises:
- detecting a first text string in the first synthetic output;
- detecting a first character in the first text string; and
- generating a substitute text string by removing the first character from the first text string.

16. A non-transitory, computer-readable medium comprising instructions recorded thereon that when executed by one or more processors cause operations comprising:
- retrieving a dataset from a user profile, wherein the user profile is stored locally on a user device;
- processing the dataset, by removing anomalies, incomplete data, or outliers, to generate a feature set;
- selecting a first feature from the feature set;
- inputting the first feature into a synthetic data generation model, wherein the synthetic data generation model generates a first synthetic output;
- obfuscating the first synthetic output to generate a first synthetic feature;
- generating a first synthetic dataset based on the first synthetic feature;
- directing a user device to train a machine learning model using the first synthetic dataset; and
- transmitting the model to a centralized remote server from the user device for training a federated learning model.

17. The non-transitory, computer-readable medium of claim 16, further comprising:
- generating a second synthetic output based on the first feature; and
- obfuscating the second synthetic output to generate a second synthetic feature, wherein the first synthetic dataset is further based on the second synthetic feature.

18. The non-transitory, computer-readable medium of claim 16, wherein obfuscating the first synthetic output to generate a first synthetic feature comprises:
- determining a secret key based on a random string of bits;
- determining an encryption algorithm; and
- encrypting the first synthetic output by using the secret key and the encryption algorithm to obfuscate the first synthetic output.

19. The non-transitory, computer-readable medium of claim 18, wherein obfuscating the first synthetic output to generate a first synthetic feature comprises:
- detecting a first text string in the first synthetic output;
- determining that the first text string comprises personally identifiable information (PII); and
- in response to determining that the first text string comprises PII, replacing the first text string with a second text string.

20. The non-transitory, computer-readable medium of claim 19, wherein determining that the first text string comprises PII comprises:
- comparing the first text string to a list of known instances of PII corresponding to the user device; and
- based on comparing the first text string to the list of known instances of PII corresponding to the user device, determining that the first text string corresponds to a first known instance of PII in the list of known instances of PII.

* * * * *